United States Patent [19]
Reed et al.

[11] Patent Number: 5,651,936
[45] Date of Patent: Jul. 29, 1997

[54] SYRUPS CONTAINING SORBITOL, A PLASTICIZING AGENT AND AN ANTICRYSTALLIZATION AGENT AND THEIR USE IN CHEWING GUM AND OTHER PRODUCTS

[75] Inventors: Michael A. Reed, Merrillville, Ind.; Victor V. Gudas, Chicago, Ill.; Pamela M. Mazurek, Orland Park, Ill.; Albert H. Chapdelaine, Naperville, Ill.; Robert J. Yatka, Orland Park, Ill.; Lindell C. Richey, Lake Zurich, Ill.; Marc A. Meyers, Sparta, N.J.

[73] Assignee: Wm. Wrigley Jr. Company, Chicago, Ill.

[21] Appl. No.: 539,970

[22] Filed: Nov. 3, 1995

Related U.S. Application Data

[63] Continuation-in-part of Ser. No. 174,983, Dec. 29, 1993, abandoned, and a continuation-in-part of Ser. No. 239,137, May 6, 1994, abandoned, and a continuation-in-part of Ser. No. 454,112, Sep. 26, 1995.

[51] Int. Cl.$^6$ ............................................. A23G 3/30
[52] U.S. Cl. ............................... 420/3; 426/5; 426/658
[58] Field of Search ............................. 426/3–6, 658, 426/548, 804

[56] References Cited

U.S. PATENT DOCUMENTS

| | | |
|---|---|---|
| Re. 26,959 | 9/1970 | Conrad. |
| 3,857,965 | 12/1974 | Ream. |
| 4,156,740 | 5/1979 | Glass et al.. |
| 4,248,895 | 2/1981 | Stroz et al.. |
| 4,250,196 | 2/1981 | Friello. |
| 4,250,197 | 2/1981 | Koch ........................................ 426/51 |
| 4,252,829 | 2/1981 | Terrevazzi. |
| 4,263,327 | 4/1981 | Pedersen et al. ........................... 426/3 |
| 4,271,197 | 6/1981 | Hopkins et al.. |
| 4,372,942 | 2/1983 | Cimiluca. |
| 4,382,962 | 5/1983 | Devos et al.. |
| 4,466,983 | 8/1984 | Cifrese et al.. |
| 4,471,001 | 9/1984 | Lynch. |
| 4,514,422 | 4/1985 | Yang et al.. |
| 4,614,654 | 9/1986 | Ream et al.. |
| 4,623,543 | 11/1986 | Motegi et al.. |
| 4,671,961 | 6/1987 | Patel et al.. |
| 4,671,967 | 6/1987 | Patel et al.. |
| 4,728,515 | 3/1988 | Patel et al.. |
| 4,738,854 | 4/1988 | Friello et al.. |
| 4,753,806 | 6/1988 | Carroll et al.. |
| 4,774,094 | 9/1988 | Carroll et al.. |
| 4,803,082 | 2/1989 | Cherukuri et al.. |
| 4,804,543 | 2/1989 | Dokuzovic et al.. |
| 4,806,364 | 2/1989 | Kubota et al.. |
| 4,834,986 | 5/1989 | Glass et al.. |
| 4,840,797 | 6/1989 | Boursier. |
| 4,933,188 | 6/1990 | Cherukuri et al.. |
| 4,959,225 | 9/1990 | Wong et al. ................................ 426/3 |
| 4,993,189 | 2/1991 | Cherukuri et al. ......................... 426/3 |
| 5,017,400 | 5/1991 | Olinger et al.. |
| 5,110,608 | 5/1992 | Cherukuri et al. ......................... 426/3 |
| 5,120,551 | 6/1992 | Yatka et al.. |
| 5,144,024 | 9/1992 | Pepper et al.. |
| 5,206,042 | 4/1993 | Dave et al. ................................ 426/5 |
| 5,223,282 | 6/1993 | Patel et al. ................................ 426/3 |
| 5,320,854 | 6/1994 | Dave et al. ................................ 426/3 |

FOREIGN PATENT DOCUMENTS

| | | |
|---|---|---|
| 0 611 527 A1 | 8/1994 | European Pat. Off.. |
| 0 625 311 A1 | 11/1994 | European Pat. Off.. |
| 0 630 575 A1 | 12/1994 | European Pat. Off.. |
| 0 664 960 A1 | 2/1995 | European Pat. Off.. |
| 1994-133697 | 5/1994 | Japan. |
| WO 95/08927 | 4/1995 | WIPO. |
| WO 95/08924 | 4/1995 | WIPO. |
| WO 95/17829 | 7/1995 | WIPO. |
| WO 95/30338 | 11/1995 | WIPO. |

*Primary Examiner*—Jeanette Hunter
*Attorney, Agent, or Firm*—Steven P. Shurtz; Brinks Hofer Gilson & Lione

[57] ABSTRACT

A chewing gum including sorbitol and method of making the same is provided. The chewing gum is created from a formulation that includes a composition that comprises a syrup solution of aqueous sorbitol, a plasticizing agent selected from glycerin, propylene glycol and mixtures thereof, and an anticrystallization agent comprising alditols other than sorbitol having a degree of polymerization (DP) of 1 or 2.

94 Claims, No Drawings

SYRUPS CONTAINING SORBITOL, A PLASTICIZING AGENT AND AN ANTICRYSTALLIZATION AGENT AND THEIR USE IN CHEWING GUM AND OTHER PRODUCTS

CROSS REFERENCE TO RELATED APPLICATIONS

This application is a continuation in part of the following: 1) U.S. patent application Ser. No. 08/174,983, filed on Dec. 29, 1993 now abandoned and entitled "Liquid Sorbitol/Mannitol/Glycerin Blend and Compositions Containing Same"; 2) U.S. patent application Ser. No. 08/239,137, filed on May 6, 1994 now abandoned and entitled "Chewing Gum Including A Liquid Sorbitol/Mannitol/Glycerin Blend"; 3) International Application Under The Patent Cooperation Treaty designating the United States, Serial No. PCT/US95/08392 filed on Jul. 5, 1995 and entitled "Syrups For Use In Chewing Gum Containing Sorbitol, A Plasticizing Agent And An Anticrystallization Agent"; and 4) International Application Under The Patent Cooperation Treaty designating the United States, Serial No. PCT/US93/09352 filed on Sep. 30, 1993 and entitled "Chewing Gum Containing Maltitol", nationalized as U.S. patent application Ser. No. 08/454,112 filed Sep. 26, 1995, pending; all of which are hereby incorporated by reference.

BACKGROUND OF THE INVENTION

The present invention relates generally to chewing gums and other confectioneries. More specifically, the present invention relates to chewing gums and other products including sorbitol.

It is known to provide alditols, such as sorbitol, mannitol, and xylitol in chewing gums and other confectioneries. Alditols can be used in chewing gum, as well as other confectioneries and food products, as a "sugar substitute." These sugar substitutes have the advantage that they are not fermented in the mouth of the consumer to form products that can attack dental enamel. Therefore, sorbitol, as well as other alditols, is used in sugarless products. Additionally, sorbitol can be used as a bulking agent.

A number of patents have disclosed and discussed the use of various compositions including sorbitol. U.S. Pat. No. 3,857,965 discloses a chewing gum composition made from melting crystalline sorbitol and mixing the melted sorbitol with gum base and a crystallization retardant. U.S. Pat. No. 4,156,740 to Glass et al., U.S. Pat. No. 4,250,196 to Friello, U.S. Pat. No. 4,252,829 to Terrevazzi and U.S. Pat. No. 4,466,983 to Cifrese et al. disclose liquid compositions containing sorbitol used as a centerfill for chewing gum. U.S. Pat. No. 5,120,551 to Yatka et al. discloses a syrup containing sorbitol and other alditols used in chewing gum compositions.

Several patents disclose a syrup for use in chewing gum which is made by mixing glycerin or propylene glycol with an aqueous hydrogenated starch hydrolysate (HSH) such as Lycasin brand HSH from Roquette, including U.S. Pat. Nos. 4,671,961; 4,671,967 and 4,728,515 to Patel et al., each of which are hereby incorporated by reference. It is believed that Lycasin brand HSH contains, on a dry basis, about 6% sorbitol, about 52% maltitol and about 42% of oligosaccharides having a degree of polymerization ("DP") of 3 or greater.

Sorbitol can be provided in chewing gum in its crystalline form. It is believed that crystalline sorbitol currently accounts for approximately 50% of typical sugar-free chewing gum formulations. Unfortunately, crystalline sorbitol is costly. Although it would be desirable to have a replacement for crystalline sorbitol, heretofore, such possible replacements were not as effective, created product stability problems, created processability issues, were even more expensive than crystalline sorbitol, and/or could not be used with certain formulations.

In this regard, aqueous sorbitol has been explored for use in chewing gum. Sorbitol in an aqueous solution is a less expensive alternative, on a dry basis, than crystalline sorbitol. Unfortunately, the use of aqueous sorbitol in chewing gum at levels above 15% can create problems with respect to product stability. Likewise, the use of aqueous sorbitol at levels above 15% can also create processability problems. This is due, it is believed, to the water content contained in the aqueous sorbitol.

Additionally, there are problems with respect to at least certain chewing gum formulations when using sorbitol in an aqueous solution. Because typical aqueous sorbitol solutions contain about 30% water, the water added with the sorbitol is detrimental to moisture sensitive ingredients when sorbitol solution is provided at high levels in chewing gum. A further difficulty with aqueous sorbitol is that it readily crystallizes and causes the gum to become brittle. While Lycasin brand HSH contains a small amount of sorbitol, it does not provide a significant amount of sorbitol such that HSH can be substituted for crystalline sorbitol.

There is therefore a need for an improved method and/or sorbitol product that allows sorbitol to be added to a chewing gum formulation or other confectionary or food product in a non-crystalline state.

SUMMARY OF THE INVENTION

The present invention provides an improved confectionary, particularly an improved chewing gum composition. More specifically, the present invention provides a chewing gum composition that includes an aqueous syrup containing sorbitol, a plasticizing agent and an anticrystallization agent. Additionally, the present invention also provides other products such as food stuffs, beverages, medicaments, and confectioneries that include the aqueous sorbitol syrup. Pursuant to the present invention, the sorbitol syrup can be used in formulations that contain levels of liquid sorbitol solution that were heretofore not possible.

In one aspect, the invention is a method of making a chewing gum composition comprising the steps of making a syrup by evaporating water from a mixture comprising an aqueous sorbitol solution containing at least 50% sorbitol; a plasticizing agent selected from glycerin, propylene glycol and mixtures thereof; and an anticrystallization agent selected from alditols other than sorbitol and having a degree of polymerization (DP) of 1 or 2; and mixing the syrup with gum base and additional chewing gum ingredients to produce the chewing gum composition.

In a second aspect, the invention is a chewing gum composition comprising a homogeneous mixture of gum base and a bulking agent wherein the bulking agent comprises an aqueous alditol syrup in which over 50% of the alditols have a DP of 1 and wherein the composition has less than 2% moisture and the syrup comprises over 35% of the composition.

In a third aspect, the invention is an aqueous syrup for use in chewing gum comprising, on a dry basis, about 50% to about 85% alditols and about 15% to about 50% plasticizing agent selected from glycerin, propylene glycol and mixtures thereof. In the syrup, about 60% to about 92% of the alditols are sorbitol, and about 8% to about 40% are alditols other than sorbitol with a degree of polymerization (DP) of 1 or 2. Any alditols present in the syrup with a DP of 3 or greater are present at a ratio to the alditols other than sorbitol with a DP of 1 or 2 of less than 2:3.

In a fourth aspect, the invention is an aqueous syrup for use in chewing gum comprising, on a dry basis, about 30% to about 80% sorbitol; about 15% to about 56% plasticizing agent selected from glycerin, propylene glycol and mixtures thereof; and about 3% to abut 30% anticrystallization agent comprising alditols other than sorbitol with a DP of 1 or 2, wherein any alditols present with a DP of 3 or greater are present at a ratio to said alditols other than sorbitol with a DP of 1 or 2 of less than 2:3.

In a fifth aspect, the invention is a method of making a syrup for use in chewing gum comprising the steps of providing sorbitol in an aqueous solution having a solids content of at least about 50% sorbitol and about 30% to about 50% water; mixing the sorbitol solution with a plasticizing agent selected from glycerin, propylene glycol and mixtures thereof and an anticrystallization agent comprising alditols other than sorbitol with a DP of 1 or 2, wherein any alditols present with a DP of 3 or greater are present at a ratio to the alditols other than sorbitol with a DP of 1 or 2 of less than 2:3; and removing moisture from the mixture to produce a syrup having a moisture content of less than about 10%.

In a sixth aspect, the invention is a method of making a syrup for use in chewing gum comprising the steps of providing sorbitol in an aqueous solution having a solids content of at least about 60% sorbitol; mixing the sorbitol solution with a plasticizing agent and an anticrystallization agent to form a mixture having, on a dry basis, a ratio of sorbitol:plasticizing agent of between about 6:1 and about 1:2 and a ratio of sorbitol:anticrystallization agent of between about 12:1 and about 3:2; and removing moisture from the mixture to produce a syrup having a moisture content of less than about 3%.

An advantage of the present invention is that it provides an improved chewing gum formulation, particularly an improved sugarless chewing gum, and improved methods for making chewing gum.

Further, an advantage of some embodiments of the invention is an improved method for adding sorbitol to chewing gum in a state other than a crystalline state.

Still further, an advantage of some embodiments of the invention is a more cost effective method of adding sorbitol to a chewing gum composition.

Another advantage of the preferred embodiment of the invention is that it allows greater levels of sorbitol to be added to the chewing gum in a non-crystalline form than heretofore practical from a commercial standpoint.

Additional features and advantages of the present invention are described in, and will be apparent from, the detailed description of the presently preferred embodiments.

DETAILED DESCRIPTION OF THE PRESENTLY PREFERRED EMBODIMENTS

All percentages herein are weight percentages unless otherwise specified. As used herein, the term "chewing gum" also includes bubble gum and the like.

The present invention provides an improved chewing gum formulation and method of making chewing gum. Pursuant to the present invention, sorbitol is provided in a non-crystalline state at levels that the inventors believe were not heretofore commercially possible utilizing liquid sorbitol in chewing gum formulations.

Sorbitol is a sugarless sweetener that is added to a variety of products. These products include food stuffs, beverages, medicaments, confectioneries and chewing gum. Sorbitol can be added either alone, without other sugarless sweeteners, for example, in sugar-free chewing gum, or in combination with sugar sweeteners. Additionally, the sorbitol can be provided in, for example, the chewing gum entirely in the syrup form of the present invention or along with a crystalline form of sorbitol.

Pursuant to the present invention, the sorbitol is added to other components of a chewing gum formulation, as a blend of aqueous sorbitol, a plasticizing agent, and an anticrystallization agent. The blend of aqueous sorbitol is provided as a syrup. This blend can be used to reduce the usage of crystalline sorbitol in standard product formulations. It has been found that the resultant product, including the sorbitol composition of the present invention, exhibits increased binding capacity over currently used binders in sugarfree gum.

The syrup of the present invention comprises, on a dry basis, about 30% to about 80% sorbitol, about 15% to about 56% of a plasticizing agent, and about 3% to about 30% of an anticrystallization agent. More preferably, the syrup comprises, on a dry basis, about 40% to about 70% sorbitol, about 20% to about 40% plasticizing agent and about 5% to about 20% anticrystallization agent. For some purposes, the syrup will comprises about 60% to about 80% sorbitol, about 15% to about 37% plasticizing agent and about 3% to about 25% anticrystallization agent. A presently preferred syrup contains about 56% sorbitol, about 38% plasticizing agent and about 6% anticrystallization agent.

Sorbitol for use in the inventive syrup will be provided in the form of an aqueous solution. The aqueous sorbitol solution will preferably contain at least 50% sorbitol, more preferably about 60% sorbitol, and most preferably about 70% sorbitol. Preferably the remainder of the solution is water. A commonly available sorbitol solution is Neosorb 70/02 from Roquette Corporation, which contains 70% sorbitol and about 30% water. It is believed that there are small amounts (about 0.75% to about 1.5%) of mannitol in this typical sorbitol solution by way of an impurity, but the amount of mannitol normally present is insufficient to prevent crystallization when the sorbitol solution is evaporated with the plasticizing agent to low moisture levels. Roquette now also sells Neosorb 70/07M, which contains 5% added mannitol, for use in hard boiled candies. It is believed that syrups of the present invention, when mannitol is desired as the anticrystallization agent, could be made from adding a plasticizing agent to Neosorb 70/07M and evaporating the water.

The plasticizing agent of the syrup of the present invention is selected from glycerin, propylene glycol and mixtures thereof. While the plasticizing agent may help prevent crystallization, its main function is to keep the syrup, with high solids level, fluid at room temperature. The ratio of sorbitol to plasticizing agent in the syrup will preferably be between about 6:1 and about 1:2, more preferably between about 4:1 and about 1:1, and most preferably between about 2:1 and about 5:4.

The anticrystallization agent prevents the sorbitol from crystallizing as high solids levels are reached while evaporating water from the syrup. Because the syrup is preferably used in sugarless formulations, the anticrystallization agent is preferably an alditol other than sorbitol. (Sorbitol cannot be used because the sorbitol would not prevent crystallization of the sorbitol in the sorbitol solution.) The alditol should have a degree of polymerization (DP) of 1 or 2, because alditols with a DP of 3 or greater cause an increased viscosity in the syrup as it is evaporated. Also, such materials generally cost more than sorbitol and other alditols with a DP of 1 or 2, and therefore increase the cost of the syrup. Preferable anticrystallization agents are believed to include maltitol, mannitol, lactitol, hydrogenated isomaltulose, xylitol, erythritol and mixtures thereof. Of this group, maltitol and mannitol are presently preferred, with maltitol and a blend of maltitol and being most preferred.

The ratio of sorbitol to anticrystallization agent in the syrup will preferably be between about 12:1 and about 3:2, more preferably between about 10:1 and about 3:1, most preferably between about 9:1 and about 6:1. Preferably over 50% of the combined alditols in the syrup will have a DP of 1, and most preferably the sorbitol comprises over 60% of the alditols.

On a dry basis, the syrup will preferably comprise about 50–85% alditols, of which about 60% to about 92% will be sorbitol and about 8% to about 40% will be alditols other than sorbitol with a DP of 1 or 2. The ratio of any alditols with a DP of 3 or greater to the alditols other than sorbitol and having a DP of 1 or 2 will preferably be less than 2:3, more preferably less than 1:2, and most preferably less than 1:3. The ratio of sorbitol to alditols other than sorbitol having a DP of 1 or 2 will preferably be between about 10:1 and about. 2:1. Preferably less than about 4% of the alditols will have a DP of 3 or greater. Most preferably the syrup will consist essentially of sorbitol, a plasticizing agent selected from glycerin, propylene glycol and mixtures thereof, and an anticrystallization agent selected from maltitol, mannitol and mixtures thereof.

When the anticrystallization agent is maltitol, the syrup preferably includes, on a dry weight basis, about 55% to about 80% sorbitol, about 17% to about 40% glycerin and about 3% to about 10% maltitol. When the anticrystallization agent is mannitol, the syrup preferably includes, on a dry weight basis, approximately 40% to about 70% sorbitol, approximately 24% to about 56% glycerin and approximately 4% to about 9% mannitol. In a preferred embodiment, the syrup includes, on a dry weight basis, approximately 47% to about 65% sorbitol; approximately 28% to about 45% glycerin, and approximately 5% to about 7% mannitol. Prior to any evaporation of the syrup, the syrup will generally contain approximately 20% water. In some products, the syrup can be used in this form. However, it is envisioned that at least some of the water will be driven off through evaporation or other means.

Generally, to make the aqueous sorbitol syrup of the present invention, aqueous sorbitol, a plasticizing agent and an anticrystallization agent are mixed together and then coevaporated to create a syrup. Preferably, the aqueous sorbitol, plasticizer agent and anticrystallization agent combination is evaporated so that it contains not more than 10% water. More preferably, the aqueous sorbitol, plasticizing agent and anticrystallization agent mixture is evaporated so that it contains no more than 7% water, even more preferably about 0.5% to about 5% water, and most preferably about 1% to about 3% water. Particularly preferred embodiments are evaporated to contain about 2% water.

In another embodiment, the syrup blend is made by hydrolyzing sucrose to dextrose and fructose. The dextrose and fructose are then hydrogenated to sorbitol and mannitol. The result will be a syrup containing sorbitol and mannitol. Glycerin can be added and the whole mixture can be coevaporated to drive off the water.

The aqueous sorbitol, plasticizing agent and anticrystallization agent can be provided in different combinations and ratios. Preferably, the syrup will be made from a mixture of about 52% to about 87% aqueous sorbitol solution, about 10% to about 45% plasticizing agent and about 3% to about 20% anticrystallization agent. More preferably, the syrup will be made from a mixture of about 60% to about 75% sorbitol solution, about 20% to about 35% plasticizing agent and about 4% to about 10% anticrystallization agent.

When the anticrystallization agent comprises maltitol, a presently preferred syrup is made with about 65% sorbitol solution (70% solids), about 30% glycerin and either about 5% maltitol or about 2.5% each of maltitol and mannitol. When mannitol is used, preferably prior to evaporation the aqueous sorbitol comprises approximately 55% to about 75% by weight of the combination, mannitol comprises approximately 3% to about 7% by weight of the combination, and glycerin comprises approximately 25% to about 45% by weight of the combination. In one preferred embodiment, prior to evaporation the aqueous sorbitol comprises approximately 60% to 70% by weight of the combination, mannitol comprises approximately 5% to 6% by weight of the combination and glycerin comprises approximately 25% to 35% by weight of the combination. In an embodiment that has been found to function satisfactorily, prior to evaporation the aqueous sorbitol comprises approximately 65% of the combination, glycerin approximately 30% and mannitol approximately 5%. This syrup will include, on a dry weight basis, 56.5% sorbitol, 37.3% glycerin, and 6.2% mannitol.

The aqueous sorbitol syrup of the present invention will most frequently be the only syrup needed in the chewing gum formulation. However, in some formulations, other aqueous syrups or solutions may be desired. For example, it may be desirable to add HSH to the gum formulation in a low moisture form, such as the coevaporated glycerin and Lycasin brand HSH disclosed in U.S. Pat. No. 4,671,961. Depending on the ratio of syrup used and the desired moisture content, it may be possible to coevaporate the sorbitol solution and HSH solutions together. However, because Lycasin brand HSH has a high level of oligosaccharides with a DP of 3 or greater, it will not be as easy to evaporate the combined syrup to as low of a moisture level as the preferred sorbitol syrup. Also, in commercial applications, it is often desirable to keep ingredients stocked in their basic form so that they can easily be used in a wide variety of products. Thus, it is preferred to provide the sorbitol syrup separately from any HSH syrup used in the gum.

Pursuant to the present invention, the aqueous sorbitol syrup can be used to create sugarless chewing gums, because sugarless chewing gum typically contains sorbitol. However, it should be noted that the present invention can be used to create any chewing gum that includes sorbitol. Likewise, aqueous sorbitol syrup can be used in any product that uses sorbitol. Such products include confectioneries, medicaments, beverages and food products.

Chewing gum generally consists of a water insoluble gum base, a water soluble portion, and flavors. The water soluble portion dissipates with a portion of the flavor over a period of time during chewing. The gum base portion is retained in the mouth throughout the chew.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum. More commonly, the gum base comprises 10 to about 50 percent of the gum, and, in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight; for styrene-butadiene, 1:1 to 1:3 bound styrene-butadiene; for polyvinyl acetate, 10,000 to 65,000 GPC weight average molecular weight, with the higher molecular weight polyvinyl acetates typically used in bubble gum base; and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters of partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The syrup of the present invention, containing water soluble ingredients, forms part of the water soluble bulk portion. The water soluble portion can also include powdered bulking agents (most typically bulk sweeteners), high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum. Additionally, the sorbitol syrup of the present invention can be used as a softener and binding agent.

Bulk sweeteners include both sugar and sugarless components. Bulk sweeteners and other bulking agents typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Generally, the sorbitol syrup of the present invention comprises about 5% to about 50% of the chewing gum formulation. Typically the syrup will comprise approximately 25% to about 45% by weight of the chewing gum composition. Preferably the syrup will comprise at least about 30% of the gum, more preferably more than 35% of the gum and most preferably more than 40% of the gum. When the syrup has a low moisture level, it may be preferable that the syrup comprises over 45% of the gum composition.

As noted above, in addition to the sorbitol syrup of the present invention, crystalline sorbitol, if desired, can also be used. Additionally, sugarless sweeteners can include, but are not limited to, other sugar alcohols such as mannitol, xylitol, hydrogenated starch hydrolysates, maltitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose, Raftilose, Raftilin, fructooligosaccharides (NutraFlora), palatinose oligosaccharide, guar gum hydrolysate (Sun Fiber), and indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

The sorbitol syrup of the present invention can be added next along with any other syrup softeners or bulking agents and part of the bulk portion. Further, parts of the bulk portion may then be added to the mixer. Flavoring agents are typically added with the final part of the bulk portion. The entire mixing process typically takes from 5 to 15 minutes, although longer mixing times are sometimes required. Those skilled in the art will recognize that variations of this general mixing procedure, or other mixing procedures, can be followed.

By way of example and not limitation, examples of chewing gum formulations constructed pursuant to the present invention are as follows:

TABLE 1

|  | Ex. 1 | Ex. 2 | Ex. 3 | Ex. 4 |
|---|---|---|---|---|
| Sugarless Syrup Blend* | 40 | 35 | 30 | 25 |
| Crystalline Sorbitol | 8.6 | 13.6 | 18.6 | 23.6 |
| Glycerin | 9.88 | 9.88 | 9.88 | 9.88 |
| Gum Base | 23.2 | 23.2 | 23.2 | 23.2 |
| Mannitol | 4.77 | 4.77 | 4.77 | 4.77 |
| Talc | 2.0 | 2.0 | 2.0 | 2.0 |

TABLE 1-continued

|  | Ex. 1 | Ex. 2 | Ex. 3 | Ex. 4 |
|---|---|---|---|---|
| Flavor | 1.65 | 1.65 | 1.65 | 1.65 |
| Encapsulated Aspartame | 0.34 | 0.34 | 0.34 | 0.34 |
| Spray Dried Peppermint Flavor | 0.25 | 0.25 | 0.25 | 0.25 |
| Coevaporated Lycasin/Glycerin** | 9.31 | 9.31 | 9.31 | 9.31 |

*created by evaporating a mixture of 65% sorbitol solution (70% sorbitol and 30% water), 30% glycerin and 5% mannitol to 98% solids.
**containing 67.5% hydrogenated starch hydrolysate solids, 25% glycerin and 7.5% moisture.

Further examples of the present invention are set forth.

EXAMPLES 5–9

A sorbitol mixture was created by placing a ratio of 65% aqueous sorbitol, 30% glycerin, and 5% mannitol in a suitable container. The mixture was evaporated to approximately 7% water. The syrup was then placed in formulas Ex. 5–Ex. 9 set forth in Table 2 below (Ex. A is a comparative formula).

TABLE 2

|  | Comp. Ex. A | Ex. 5 | Ex. 6 | Ex. 7 | Ex. 8 | Ex. 9 |
|---|---|---|---|---|---|---|
| Crystalline Sorbitol | 49.17 | 27.56 | 32.56 | 35.56 | 36.65 | 41.79 |
| Gum Base | 23.2 | 23.2 | 23.2 | 23.2 | 23.2 | 23.2 |
| Sugarless Syrup Blend* | — | 45.0 | 40.0 | 35.0 | 30.0 | 25.0 |
| Coevaporated Lycasin/Glycerin** | 9.31 | — | — | — | — | — |
| Glycerin | 9.31 | — | — | — | 2.64 | 2.7 |
| Mannitol | 4.77 | — | — | 2.0 | 3.27 | 3.07 |
| Peppermint Flavor | 1.65 | 1.65 | 1.65 | 1.65 | 1.65 | 1.65 |
| Encapsulated Aspartame | 0.34 | 0.34 | 0.34 | 0.34 | 0.34 | 0.34 |
| Spray Dried Peppermint Flavor | 0.25 | 0.25 | 0.25 | 0.25 | 0.25 | 0.25 |
| Talc | 2.0 | 2.0 | 2.0 | 2.0 | 2.0 | 2.0 |

*Created by evaporating a mixture of 65% sorbitol solution (70% sorbitol and 30% water), 30% glycerin and 5% mannitol to 98% solids.
**Containing 67.5% hydrogenated starch hydrolysate solids, 25% glycerin and 7.5% moisture.

A reduction of 55% crystalline sorbitol was achieved by using the present invention. In this regard, 45% of the necessary sorbitol is provided by the syrup of the present invention and a satisfactory chewing gum is still achieved. Additionally, it was noted in chewing the gum formulas that used the sorbitol syrup of the present invention (Exs. 5–9) that an increase in binding capacity was achieved as compared to a current chewing gum binder Lycasih/glycerin (Comp. Ex. A).

The sugarless syrup containing liquid sorbitol, mannitol and glycerin described above and disclosed in two of the parent applications has been found to be a suitable replacement for most of the crystalline sorbitol and as a way to increase the binding capacity over currently used binders in sugarless gum. However, it has been found that the use of maltitol in the syrup provides an improvement of the sugarless syrup containing mannitol. By replacing the mannitol with maltitol in the coevaporated syrup, there is improvement in the texture, and flavor properties of the sugarless gum.

One improved sugarless syrup blend was made by evaporating a mixture of 75% aqueous sorbitol solution (containing 70% sorbitol and 30% water), 20% glycerin and 5% maltitol to 98% solids. The mixture was placed into a vacuum cooker set at 200° F under a pressure of 5 inches of mercury. The evaporation can also take place in a steam kettle.

Once the mixture has been evaporated to the optimum solids level, it can be put into chewing gum. The sugarless syrup has many properties similar to those of corn syrup, however, the sugarless syrup has a smoother texture.

This mixture, when placed in gum at the optional level, will cause the gum to have a more intense flavor release and higher sweetness. The flavor becomes cleaner and stronger and is not masked by the addition of the sugarless syrup. Chewing gum formulations containing this improved sugarless blend are shown in Examples 10-11, along with Comparative Example B, in Table 3.

TABLE 3

|  | Comp. Ex. B | Ex. 10 | Ex. 11 |
| --- | --- | --- | --- |
| Improved Sugarless Syrup Blend (sorbitol/glycerin/ maltitol) | — | 40.000 | 44.000 |
| Crystalline Sorbitol | 64.605 | 24.605 | 24.605 |
| Glycerine | 4.000 | 4.000 | — |
| Gum Base | 26.420 | 26.420 | 26.420 |
| Mannitol | 3.000 | 3.000 | 3.000 |
| Lecithin | 0.130 | 0.130 | 0.130 |
| Flavor | 1.630 | 1.630 | 1.630 |
| Encapsulated Aspartame | 0.215 | 0.215 | 0.215 |

Lab scale sensory results with this blend of sorbitol, glycerin and maltitol show that the overall flavor quality improves and there is an enhancement of the existing sweetness level.

As previously noted, the sorbitol syrup can be used to create other products aside from chewing gum. By way of example, and not limitation, such other products may have the following formulas.

EXAMPLES 12-17

A sorbitol syrup containing a plasticizing agent and an anticrystallization agent and only 2% water (hereinafter "98% sorbitol syrup") such as used in any of Examples 1-11, may be used in a sugarless, non-cariogenic hard candy as shown in the following formulas:

EXAMPLE 12

Fruit Flavored hard candy:

|  | % |
| --- | --- |
| Xylitol | 15.8 |
| Sorbitol | 34.8 |
| 98% Sorbitol Syrup | 38.0 |
| Water | 11.0 |
| Citric Acid | 0.3 |
| Artificial Sweetener/ Fruit Flavor/Color | as needed |

EXAMPLE 13

Butterscotch Hard Candy:

|  | % |
| --- | --- |
| 98% Sorbitol Syrup | 53.6 |
| Sorbitol | 26.4 |
| Water | 17.66 |
| Butter | 2.06 |
| Salt | 0.12 |
| Natural and Artificial Flavor | 0.16 |

EXAMPLE 14

Hard Candy:

|  | % |
| --- | --- |
| Sorbitol | 30.0 |
| 98% Sorbitol Syrup | 60.0 |
| Xylitol | 9.35 |
| Aspartame | 0.35 |
| Salt | 0.12 |
| Citric Acid/Flavor/Color | as needed |

Procedure:

Hard candies can be made by the following procedure:

1. In a stainless steel, steam jacketed kettle, the 98% sorbitol syrup, xylitol, water, sorbitol, and salt are added and the mixture is heated to form a thick syrup.
2. The syrup is cooked and mixed until a temperature of about 300° F. and a moisture level of about 1-2% is obtained.
3. The heavy syrup is poured onto a stainless steel cooling table.
4. Citric acid, artificial ingredients, flavors and color, and butter are added and mixed by kneading.
5. The resultant product is allowed to cool to room temperature and cut as needed.

EXAMPLE 15

(sugarless taffy)

98% sorbitol syrup may be used to prepare a sugar-free taffy by the following formula and procedure:

| Formula: | | | |
| --- | --- | --- | --- |
|  | % As Is | % DSB | 20# (9.072 Kg) Batch |
| 98% Sorbitol Syrup | 94.5 | 92.7 | 18.9 (8.573 Kg) |
| 110° F., M.P. Vegetable oil | 5.25 | 7.0 | 1.0 (0.476 Kg) |
| Lecithin | 0.25 | 0.3 | 0.3 (0.136 Kg) |
| Flavor/Color/Acid/ Sweetener | As needed | | |

Procedure:

1. Weigh 98% sorbitol syrup into an atmospheric cooker, such as a Savage open fire cooker, and cook to about 255° F. (123.9° C.). No agitation is required for this step.
2. Allow the cooked 98% sorbitol syrup to cool to about 230° F. and add fat and lecithin; fat does not have to be premelted. Mix until uniform.
3. Pour mass on oiled cooling table. Side bars may be necessary for initial cooling if table is small 4. Work in color, flavor and acid on the slab before pulling (color and flavor may also be added, on puller). Cool to plastic texture.

5. Pull cooked mass until desired texture is attained. Cut and wrap in moisture resistant packaging.

EXAMPLE 16

(sugar-free caramel)

98% sorbitol syrup may be used to prepare a sugar-free caramel by the following formula and procedure:

| | |
|---|---|
| 98% Sorbitol Syrup | 58.53% |
| Evaporated milk | 33.24 |
| Coconut Oil, 92° F. (33° C.) | 7.68 |
| Lecithin | 0.20 |
| Salt | 0.20 |
| Aspartame | 0.11 |
| Vanillin | 0.04 |
| Total | 100.00% |

Procedure:

1. Prepare aspartame slurry by mixing ⅓ ratio of aspartame to coconut oil in a high shear blender for about 30 seconds.

2. Premix all ingredients, except aspartame slurry, half of the evaporated milk and the vanillin, for 5 minutes at about 120° F. (48.9° C.).

3. Bring premix to a boil and slowly add the balance of the evaporated milk, maintaining the boil.

4. Cook to the desired texture. Final cook temperature will vary according to the cooking process. A suggested final cook temperature is about 245° F. (118.3° C.).

5. Cool the caramel to about 220° F. (104° C.) and add the aspartame slurry slowly with mixing. The vanillin should also be added at this time.

6. Slab, cut and wrap as desired.

EXAMPLE 17

(sugarless gum drops)

| | % |
|---|---|
| Gelatin 200 bloom type B | 7.0 |
| Crystalline sorbitol | 34.9 |
| 98% Sorbitol Syrup | 32.6 |
| Hot Water (80–90° C.) | 14.0 |
| Water | 10.0 |
| Citric Acid Solution | 1.5 |
| Fruit Flavor/Color | as needed |

Procedure:

1. Dissolve gelatin directly in hot water.

2. Cook the 98% sorbitol syrup, sorbitol and water at 115° C., and add gelatin solution.

3. Stir slowly in order to obtain a smooth homogenous mixture.

4. Remove air bubbles with deaeration equipment or other available means.

5. Add citric acid solution, flavor and color.

6. Deposit in cool and dry starch, and sprinkle a little starch onto the articles.

Temperature: 70° C. Total solids when depositing: 78° C. Brix.

7. Store the starch tray at room temperature for 24 hours.

8. After removal from the molding starch, oil the articles or coat with mannitol.

Other food items in which 98% sorbitol syrup may be used as a non-cariogenic bulking agent are:

1. Confections and frostings.
2. Dressings for salads.
3. Frozen dairy deserts and mixes.
4. Gelatins, puddings and fillings.
5. Hard candy.
6. Soft candy.
7. Baked goods and baking mixes.

It should be appreciated that the products and methods of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of making a chewing gum composition comprising the steps of:

a) making a syrup by evaporating water from a mixture comprising:

i) an aqueous sorbitol solution containing at least 50% sorbitol;

ii) a plasticizing agent selected from glycerin, propylene glycol and mixtures thereof; and iii) an anticrystallization agent selected from alditols other than sorbitol and having a degree of polymerization (DP) of 1 or 2; and b) mixing the syrup with gum base and additional chewing gum ingredients to produce the chewing gum composition.

2. The method of claim 1 wherein the anticrystallization agent is selected from the group consisting of maltitol, mannitol, lactitol, hydrogenated isomaltulose, xylitol, erythritol and mixtures thereof.

3. The method of claim 1 wherein the anticrystallization agent is either maltitol, mannitol or mixtures thereof.

4. The method of claim 1 wherein the anticrystallization agent is added to the mixture in powdered form.

5. The method of claim 1 wherein the additional chewing gum ingredients comprise a flavoring agent and a powdered bulking agent.

6. The method of claim 1 wherein the chewing gum composition is sugarless.

7. The method of claim 1 wherein the mixture, prior to evaporation, comprises about 52% to about 87% sorbitol solution, about 10% to about 45% plasticizing agent and about 3% to about 20% anticrystallization agent.

8. A chewing gum composition comprising a homogeneous mixture of gum base and a bulking agent wherein the bulking agent comprises an aqueous alditol syrup in which over 50% of the alditols have a DP of 1 and wherein the composition has less than 2% moisture and said syrup comprises over 35% of said composition.

9. The chewing gum composition of claim 8 wherein said syrup comprises over 40% of the composition.

10. The chewing gum composition of claim 8 wherein sorbitol comprises over 60% of the alditols in said syrup.

11. An aqueous syrup for use in chewing gum comprising, on a dry basis:
   a) about 50% to about 85% alditols, of which
      i) about 60% to about 92% are sorbitol, and
      ii) about 8% to about 40% are alditols other than sorbitol with a degree of polymerization (DP) of 1 or 2; and
      iii) any alditols present with a DP of 3 or greater are present at a ratio to said alditols other sorbitol with a DP of 1 or 2 of less than 2:3; and
   b) about 15% to about 50% plasticizing agent selected from glycerin, propylene glycol and mixtures thereof.

12. The syrup of claim 11 wherein the syrup has a moisture content of about 0.5% to about 5%.

13. The syrup of claim 11 wherein the ratio of sorbitol to said alditols other than sorbitol with a DP of 1 or 2 is between about 10:1 and about 2:1.

14. The syrup of claim 11 wherein the syrup comprises, on a dry basis; about 55% to about 80% sorbitol, about 17% to about 40% glycerin and about 3% to about 10% maltitol.

15. The syrup of claim 11 wherein less than 4% of the alditols have a DP of 3 or greater.

16. An aqueous syrup for use in chewing gum comprising, on a dry basis:
   a) about 60% to about 80% sorbitol,
   b) about 15% to about 37% plasticizing agent selected from glycerin, propylene glycol and mixtures thereof, and
   c) about 3% to about 25% anticrystallization agent selected from alditols other than sorbitol and having a degree of polymerization (DP) of 1 or 2.

17. The syrup of claim 16 wherein the anticrystallization agent is selected from the group consisting of mannitol, maltitol, lactitol, hydrogenated isomaltulose, xylitol, erythritol and mixtures thereof.

18. An aqueous syrup for use in chewing gum comprising, on a dry basis:
   a) about 30% to about 80% sorbitol;
   b) about 15% to about 56% plasticizing agent selected from glycerin, propylene glycol and mixtures thereof; and
   c) about 3% to about 30% anticrystallization agent comprising alditols other than sorbitol with a DP of 1 or 2, wherein any alditols present with a DP of 3 or greater are present at a ratio to said alditols other than sorbitol with a DP of 1 or 2 of less than 2:3.

19. The syrup of claim 18 wherein the syrup comprises, on a dry basis, about 56% sorbitol, about 38% glycerin and about 6% maltitol.

20. The aqueous syrup of claim 18 wherein the syrup is evaporated from a mixture comprising:
   a) about 52% to about 87% of an aqueous solution containing at least 50% sorbitol,
   b) about 10% to about 45% glycerin and
   c) about 3% to about 20% anticrystallization agent selected from maltitol, mannitol and mixtures thereof.

21. The aqueous syrup of claim 20 wherein the syrup comprises about 2% moisture.

22. A method of making a syrup for use in chewing gum comprising the steps of:
   a) providing sorbitol in an aqueous solution having a solids content of at least about 50% sorbitol and about 30% to about 50% water;
   b) mixing said sorbitol solution with
      i) a plasticizing agent selected from glycerin, propylene glycol and mixtures thereof and
      ii) an anticrystallization agent comprising alditols other than sorbitol with a DP of 1 or 2, wherein any alditols present with a DP of 3 or greater are present at a ratio to said alditols other than sorbitol with a DP of 1 or 2 of less than 2:3; and
   c) removing moisture from said mixture to produce a syrup having a moisture content of less than about 10%.

23. The method of claim 22 wherein the mixture comprises, on a dry basis, about 15% to about 50% plasticizing agent.

24. The method of claim 22 wherein the mixture comprises, on a dry basis, about 3% to about 30% anticrystallization agent.

25. The method of claim 22 wherein the anticrystallization agent is selected from the group consisting of maltitol, mannitol, lactitol, hydrogenated isomaltulose, xylitol, erythritol and mixtures thereof.

26. The method of claim 22 wherein the ratio of any alditols with a DP of 3 or greater to said alditols other than sorbitol with a DP of 1 or 2 is less than 1:2.

27. The method of claim 22 wherein the evaporation is carried out under vacuum.

28. The method of claim 22 wherein the sorbitol solution comprises about 70% sorbitol and about 30% water.

29. The method of claim 22 wherein the mixture comprises about 52% to about 87% sorbitol solution, about 10% to about 45% glycerin and about 3% to about 20% maltitol, mannitol or a mixture of maltitol and mannitol.

30. The method of claim 22 wherein the mixture consists essentially of water, sorbitol, glycerin and either maltitol, mannitol or mixtures thereof.

31. The method of claim 22 wherein the syrup is evaporated to a moisture content of less than about 5%.

32. The method of claim 22 wherein the syrup is evaporated to a moisture content of less than about 3%.

33. The method of claim 22 wherein the anticrystallization agent is in a powdered form when it is mixed into the syrup.

34. The method of claim 1 wherein the step of mixing the syrup with the gum base comprise:
   a) providing about 5% to about 95% gum base;
   b) providing about 5% to about 95% of a bulking agent, the bulking agent comprising the syrup;
   c) providing about 0.1 to about 15% flavoring agent; and
   d) mixing the gum base, bulking agent and flavoring agent to form the chewing gum composition.

35. The method of claim 34 wherein the syrup comprises over 30% of the chewing gum composition.

36. A method of making a chewing gum composition comprising the steps of:
   a) evaporating a mixture comprising sorbitol solution, glycerin and maltitol and
   b) mixing the evaporated mixture with gum base and a flavoring agent to form the chewing gum composition.

37. The method of claim 36 wherein the ratio of maltitol to any other alditols in the syrup having a DP of 3 or greater is greater than 2:1.

38. The method of claim 36 wherein the sorbitol solution comprises about 70% sorbitol and about 30% water and the mixture comprises about 52% to about 87% of said sorbitol solution, about 10% to about 45% glycerin and about 3% to about 20% powdered maltitol.

39. A chewing gum formulation comprising:

a) a water insoluble gum base; and b) a water soluble portion which includes sorbitol syrup comprising approximately 25% to about 45% by weight of the formulation, the syrup being produced by coevaporating a solution that comprises, prior to coevaporation, approximately 55% to about 75% by weight aqueous sorbitol, approximately 3% to 7% by weight of an anticrystallization agent selected from the group consisting of maltitol, mannitol and mixtures thereof, and approximately 25% to about 45% by weight of a plasticizing agent selected from the group consisting of glycerin, propylene glycol and mixtures thereof.

40. The chewing gum of claim 39 wherein the syrup is produced by coevaporating a solution that comprises, prior to coevaporation:

a) approximately 55 to about 75% by weight aqueous sorbitol;

b) approximately 3 to about 7% by weight mannitol; and c) approximately 25 to about 45% by weight glycerin.

41. The chewing gum formulation of claim 39 wherein the syrup includes not more than 10% water.

42. The chewing gum formulation of claim 39 wherein the formulation includes a crystalline form of sorbitol.

43. The chewing gum formulation of claim 39 wherein the formulation is sugar-free.

44. The chewing gum formulation of claim 39 wherein the water insoluble gum base is wax-free.

45. The chewing gum formulation of claim 39 wherein the formulation includes an artificial sweetener.

46. The chewing gum formulation of claim 39 wherein the formulation includes glycerin.

47. The chewing gum formulation of claim 39 wherein the formulation includes a mixture of a hydrogenated starch hydrolysate and glycerin.

48. A substantially sugar-free chewing gum comprising:

a) a water insoluble base; and b) a water soluble portion which includes a syrup of coevaporated aqueous sorbitol, glycerin and either maltitol, mannitol or mixtures thereof, the syrup being produced by the coevaporation of a solution that comprises, prior to coevaporation, approximately 55% to about 75% by weight aqueous sorbitol, approximately 3% to 7% by weight of an anticrystallization agent selected from the group consisting of maltitol, mannitol and mixtures thereof, and approximately 25% to about 45% by weight of a plasticizing agent selected from the group consisting of glycerin, propylene glycol and mixtures thereof.

49. The chewing gum of claim 48 wherein the syrup is produced by the coevaporation of a solution that comprises, prior to coevaporation:

a) approximately 55 to about 75% by weight aqueous sorbitol;

b) approximately 3 to about 7% by weight mannitol; and c) approximately 25 to about 45% by weight glycerin.

50. The chewing gum of claim 48 wherein the syrup includes not more than 10% water.

51. The chewing gum of claim 48 wherein the syrup comprises not more than 3% water.

52. The chewing gum of claim 48 wherein the syrup includes, on a dry weight basis, not including any water that may be present:

a) approximately 40 to about 70% by weight sorbitol;

b) approximately 24 to about 56% by weight glycerin; and c) approximately 4 to about 9% by weight mannitol.

53. The chewing gum of claim 48 wherein the syrup includes, on a dry weight basis not including any water that may be present:

a) approximately 47 to about 65% by weight sorbitol;

b) approximately 28 to about 45% by weight glycerin; and c) approximately 5 to about 7% by weight mannitol.

54. The chewing gum of claim 48 wherein the water insoluble gum base is wax-free.

55. The chewing gum of claim 48 wherein the chewing gum does not include any sugar.

56. A method of making chewing gum comprising the step of:

adding to a water insoluble gum base a flavor and a syrup comprising approximately 25% to about 45% of a total mixture that is used to make the chewing gum, the syrup being produced by the coevaporation of a solution that comprises, prior to coevaporation, approximately 55% to about 75% by weight aqueous sorbitol, approximately 3% to 7% by weight of an anticrystallization agent selected from the group consisting of maltitol, mannitol and mixtures thereof, and approximately 25% to about 45% by weight of a plasticizing agent selected from the group consisting of glycerin, propylene glycol and mixtures thereof.

57. The method of claim 56 wherein the syrup is produced by coevaporating a solution that comprises, prior to coevaporation:

a) approximately 55 to about 75% by weight aqueous sorbitol;

b) approximately 3 to about 7% by weight mannitol; and c) approximately 25 to about 45% by weight glycerin.

58. The method of claim 56 wherein the syrup includes not more than 10% water.

59. A method for producing chewing gum that includes sorbitol comprising the steps of:

a) providing a syrup consisting essentially of:
   i) aqueous sorbitol,
   ii) a plasticizing agent selected from the group consisting of glycerin, propylene glycol and mixtures thereof, and
   iii) an anticrystallization agent selected from the group consisting of maltitol, mannitol and mixtures thereof; and b) adding the syrup to other components to create a chewing gum formulation.

60. The method of claim 59 wherein the syrup is produced by coevaporating a solution that comprises, prior to coevaporation:

a) approximately 55 to about 75% by weight aqueous sorbitol;

b) approximately 3 to about 7% by weight mannitol; and c) approximately 25 to about 45% by weight glycerin.

61. The method of claim 59 wherein the syrup includes not more than 10% water.

62. The method of claim 59 wherein the chewing gum formulation includes a crystalline form of sorbitol.

63. The method of claim 59 wherein the chewing gum formulation is sugar-free.

64. The method of claim 59 wherein the syrup comprises approximately 25 to about 45% by weight of the chewing gum formulation.

65. A method for adding sorbitol to a product including other components comprising the steps of:

a) producing a solution that consists essentially of:

i) aqueous sorbitol,
ii) a plasticizing agent selected from the group consisting of glycerin, propylene glycol and mixtures thereof, and
iii) an anticrystallization agent selected from the group consisting of maltitol, mannitol and mixtures thereof;

b) coevaporating the solution into a syrup and c) adding the syrup to the other components.

66. The method of claim 65 wherein the product is a chewing gum.

67. The method of claim 65 wherein the product is a confection.

68. The method of claim 65 wherein the product is a medicament.

69. The method of claim 65 wherein the product is a food stuff.

70. The method of claim 65 wherein the product is a beverage.

71. The method of claim 65 wherein the solution comprises, prior to coevaporation:

a) approximately 55 to about 75% by weight aqueous sorbitol;

b) approximately 3 to about 7% by weight mannitol; and c) approximately 25 to about 45% by weight glycerin.

72. The method of claim 65 wherein the syrup includes not more than 10% water.

73. The method of claim 65 wherein the product is sugar-free.

74. A sorbitol containing product comprising a syrup consisting essentially of:

a) aqueous sorbitol, b) a plasticizing agent selected from the group consistent of glycerin, propylene glycol and mixtures thereof; and c) an anticrystallization agent selected from the group consisting of maltitol, mannitol and mixtures thereof.

75. The product of claim 74 wherein the syrup is created by the coevaporation of a solution that comprises, prior to coevaporation:

a) approximately 55 to about 75% by weight aqueous sorbitol;

b) approximately 3 to about 7% by weight mannitol; and c) approximately 25 to about 45% by weight glycerin.

76. The product of claim 74 wherein the syrup includes not more than 10% water.

77. The product of claim 74 wherein the syrup comprises not more than 3% water.

78. The product of claim 74 wherein the syrup includes, on a dry weight basis, not including any water that may be present:

a) approximately 40 to about 70% by weight sorbitol;

b) approximately 24 to about 56% by weight glycerin; and c) approximately 4 to about 9% by weight mannitol.

79. The product of claim 74 wherein the syrup includes, on a dry weight basis, not including any water that may be present:

a) approximately 47 to about 65% by weight sorbitol;

b) approximately 28 to about 45% by weight glycerin; and c) approximately 5 to about 7% by weight mannitol.

80. A method for making a sorbitol syrup consisting essentially of the steps of:

a) hydrolyzing sucrose to dextrose and fructose;

b) hydrogenating the dextrose and fructose to create a syrup; and c) adding glycerin to the syrup.

81. The method of claim 80 including the step of coevaporating the syrup/glycerin product.

82. The product of the method of claim 80.

83. The product of the method of claim 81.

84. A method for making a sorbitol syrup comprising the steps of:

a) providing an aqueous solution of sorbitol; and b) adding to the aqueous solution of sorbitol only i) a plasticizing agent selected from the group consisting of glycerin, propylene glycol and mixtures thereof, and ii) an anticrystallization agent selected from the group consisting of maltitol, mannitol and mixtures thereof.

85. The method of claim 84 including the step of coevaporating the syrup.

86. The method of claim 85 wherein the syrup is created by the coevaporation of a solution that comprises, prior to coevaporation:

a) approximately 55 to about 75% by weight aqueous sorbitol;

b) approximately 3 to about 7% by weight mannitol; and c) approximately 25 to about 45% by weight glycerin.

87. The method of claim 85 wherein the syrup includes not more than 10% water.

88. The product of the method of claim 84.

89. The method of claim 1 wherein the anticrystallization agent is mannitol.

90. The method of claim 1 wherein the anticrystallization agent is maltitol.

91. The method of claim 1 wherein the anticrystallization agent is a mixture of mannitol and maltitol.

92. The method of claim 1 wherein the plasticizing agent is glycerin.

93. The method of claim 1 wherein the anti-crystallization agent is selected from this group consisting of maltitol, lactitol, hydrogenated isomaltulose, xylitol, erythritol and mixtures thereof.

94. A method of making a syrup for use in chewing gum comprising the steps of:

a) providing sorbitol in an aqueous solution having a solids content of at least about 60% sorbitol;

b) mixing said sorbitol solution with a plasticizing agent and an anticrystallization agent to form a mixture having, on a dry basis, a ratio of sorbitol:plasticizing agent of between about 6:1 and about 1:2 and a ratio of sorbitol:anticrystallization agent of between about 12:1 and about 3:2; and c) removing moisture from said mixture to produce a syrup having a moisture content of less than about 3%.

* * * * *

UNITED STATES PATENT AND TRADEMARK OFFICE
CERTIFICATE OF CORRECTION

PATENT NO. : 5,651,936
DATED : July 29, 1997
INVENTOR(S) : Michael A. Reed et al.

It is certified that error appears in the above-indentified patent and that said Letters Patent is hereby corrected as shown below:

On the title page, Item [56],

In column 2, line 16, under "U.S. PATENT DOCUMENTS" replace "2/1991" with --6/1990--.

In column 3, line 10, replace "abut" with --about--.

In column 4, line 20, replace "sugarfree" with --sugar-free--.

In column 4, line 29, replace "comprises" with --comprise--.

In column 5, line 12, after "and" insert --mannitol--.

In column 5, line 29, delete "." immediately after the first occurrence of "about".

In column 5, line 46, after "mannitol." start a new paragraph.

In column 10, line 52, replace "Lycasih/glycerin" with --Lycasin/glycerin--.

In column 12, line 67, insert --.-- immediately after "small".

UNITED STATES PATENT AND TRADEMARK OFFICE
CERTIFICATE OF CORRECTION

PATENT NO. :   5,651,936
DATED      :   July 29, 1997
INVENTOR(S):   Michael A. Reed et al.

It is certified that error appears in the above-indentified patent and that said Letters Patent is hereby corrected as shown below:

In column 13, line 2, delete "." immediately after "added".

In column 14, line 5, replace "deserts" with --desserts--.

<u>In the Claims</u>

In Claim 11, line 9, after "other" insert --than--.

In Claim 74, line 4, replace "consistent" with --consisting--.

In Claim 93, line 1, replace "anti-crystallization" with --anticrystallization--.

Signed and Sealed this

Twenty-seventh Day of July, 1999

Attest:

Q. TODD DICKINSON

*Attesting Officer*    *Acting Commissioner of Patents and Trademarks*